(12) United States Patent
Sachs et al.

(10) Patent No.: US 7,095,729 B2
(45) Date of Patent: Aug. 22, 2006

(54) METHOD FOR MULTIMEDIA COMMUNICATION OVER PACKET CHANNELS

(75) Inventors: Daniel Grobe Sachs, Urbana, IL (US); Igor V. Kozintsev, San Jose, CA (US); Minerva Ming Lee Yeung, Sunnyvale, CA (US)

(73) Assignee: Intel Corporation, Santa Clara, CA (US)

( * ) Notice: Subject to any disclaimer, the term of this patent is extended or adjusted under 35 U.S.C. 154(b) by 502 days.

(21) Appl. No.: 09/746,486

(22) Filed: Dec. 22, 2000

(65) Prior Publication Data

US 2002/0080802 A1 Jun. 27, 2002

(51) Int. Cl.
*H04Q 7/28* (2006.01)
(52) U.S. Cl. ..................... 370/341; 714/746
(58) Field of Classification Search ........... 370/350, 370/395.52, 401, 522; 714/746, 748, 749, 714/752, 784
See application file for complete search history.

(56) References Cited

U.S. PATENT DOCUMENTS

| | | | | |
|---|---|---|---|---|
| 4,718,066 A | * | 1/1988 | Rogard | 714/751 |
| 5,754,754 A | * | 5/1998 | Dudley et al. | 714/18 |
| 5,968,197 A | * | 10/1999 | Doiron | 714/748 |
| 5,983,382 A | | 11/1999 | Pauls | |
| 6,307,487 B1 | * | 10/2001 | Luby | 341/50 |
| 6,366,622 B1 | * | 4/2002 | Brown et al. | 375/322 |
| 6,421,387 B1 | * | 7/2002 | Rhee | 375/240.27 |
| 6,421,803 B1 | * | 7/2002 | Persson et al. | 714/752 |
| 6,629,285 B1 | * | 9/2003 | Gerendai et al. | 714/748 |
| 6,711,128 B1 | * | 3/2004 | Ramakrishnan | 370/230 |

FOREIGN PATENT DOCUMENTS

| | | |
|---|---|---|
| EP | 0 924 890 A | 6/1999 |
| WO | WO 0021236 A | 4/2000 |
| WO | PCT US0145131 | 7/2000 |

OTHER PUBLICATIONS

Byers, J. W, et al., "Accessing Multiple Mirror Sites In Parallel: Using Tornado Codes To Speed Up Downloads", Infocom '99, Eighteenth Annual Joint Conference Of The IEEE Computer and Communications Societies, pp. 275-283, Proceedings, IEEE New York, NY, USA.
Lin, S., et al., "Automatic-Repeat-Request-Error Control Schemes", IEEE Communications Magazine, IEEE Service Center, pp. 5-17 , vol. 22, No. 12.Piscataway, N.J., USA.

* cited by examiner

*Primary Examiner*—Steven Nguyen
*Assistant Examiner*—Toan Nguyen
(74) *Attorney, Agent, or Firm*—Blakely, Sokoloff, Taylor & Zafman LLP

(57) ABSTRACT

In one embodiment, a forward error correction code is applied to a group of data packets to create a coded group of packets by supplementing a set of parity packets for each group of data packets. The data packets of a first group of packets and a set of parity packets corresponding to the data packets are transmitted. If an acknowledgement is received, sending of additional packets is ceased. If an acknowledgment is not received, parity bits continue to be transmitted.

25 Claims, 3 Drawing Sheets

METHOD FOR MULTIMEDIA COMMUNICATION OVER PACKET CHANNELS

BACKGROUND

In order to distribute and store multimedia data, the multimedia data is transmitted over a communication channel. Multimedia data primarily refers to audio and visual data but may also include other types of data. The channel is often subject to noise and interference, as in the case of wireless channel, and to congestion, as in the case of wired Internet, both resulting in loss of data during transmission.

Two methods can be used to combat data losses during transmission. Forward error correction (FEC) is a method of transforming the data message, represented by a sequence of symbols from a finite alphabet, by supplementing a parity data, another sequence of symbols, to ensure that if components of a codeword are altered, below some designated threshold, the original data can be usually extracted intact. FEC therefore provides error resilience by increasing the amount of data to be sent. FEC does not require a return channel and is typically not adaptive to the current state of the channel. FEC does not guarantee that the data will arrive to the receiver without errors, however. A higher-level protocol implementing some form of repeat request for data that tolerates little errors is required for this to be addressed. Alternatively, in multimedia communications the delay requirements often dominate the error-free transmission requirements, making error-free transmission a lesser priority.

Basic automatic repeat request (ARQ) is an alternative approach to assist in robust data communications. ARQ operates by dividing the data into packets and appending a special error check sequence to each packet for error detection purpose. The data packets and error checks are communicated over a channel and the receiver decides whether a transmission error occurred by calculating the check sequence and comparing the calculated check sequence to the appended error check sequence. If a discrepancy is found the error is declared and the receiver requests the transmitter using the return channel to resend the packet by sending a negative acknowledgement signal. If no discrepancy is found the receiver sends a positive acknowledgement signal to the transmitter. To alert the transmitter of the error, ARQ requires two-way communication channel to be present. Often, the return channel uses the same physical medium as the forward channel, effectively expanding the data size because of retransmissions and communication of control information. The difference between the FEC and ARQ is that ARQ is inherently channel adaptive, since only lost packets are retransmitted, while FEC typically adds overhead to all packets. Yet, ARQ may introduce significant delays due to roundtrip propagation time and processing time. The last condition significantly limits the application of ARQ to multimedia communications.

What is needed is a way to combine the two error control methods to improve their performance for multimedia communications and to facilitate multimedia streaming services and user playback experience.

DETAILED DESCRIPTION

The method and apparatus described herein may provide improved channel bandwidth utilization for multimedia communications. According to one embodiment, the method and apparatus described herein includes an FEC and ARQ component, (which may be referred to as a hybrid automatic repeat request (HARQ)). The FEC component is used to protect the user datagram protocol (UDP) transported multimedia data against channel fades and errors, and the ARQ component is used to ensure efficient channel utilization and robustness to errors in the return channel. As a result, an improved quality of multimedia can be obtained using the HARQ method compared to the conventional methods under limited channel bandwidth constraints.

The method and apparatus described herein can be used for robust multimedia communications over networks including wired (IP) networks, cellular packet data networks, wireless LAN's, power and telephone line networks, as well as many proprietary nonstandard packet-based networks. Incorporating a software and hardware support for the robust communication method and apparatus will facilitate multimedia communication applications including multimedia streaming, distant learning and mobile video communications.

In one embodiment, the HARQ system design is used on a packet erasure channel, specifically a channel that provides the locations of packets that had errors during transmission. A packet erasure channel is often implemented at the physical layer using cyclic redundancy check (CRC).

Figure 1:
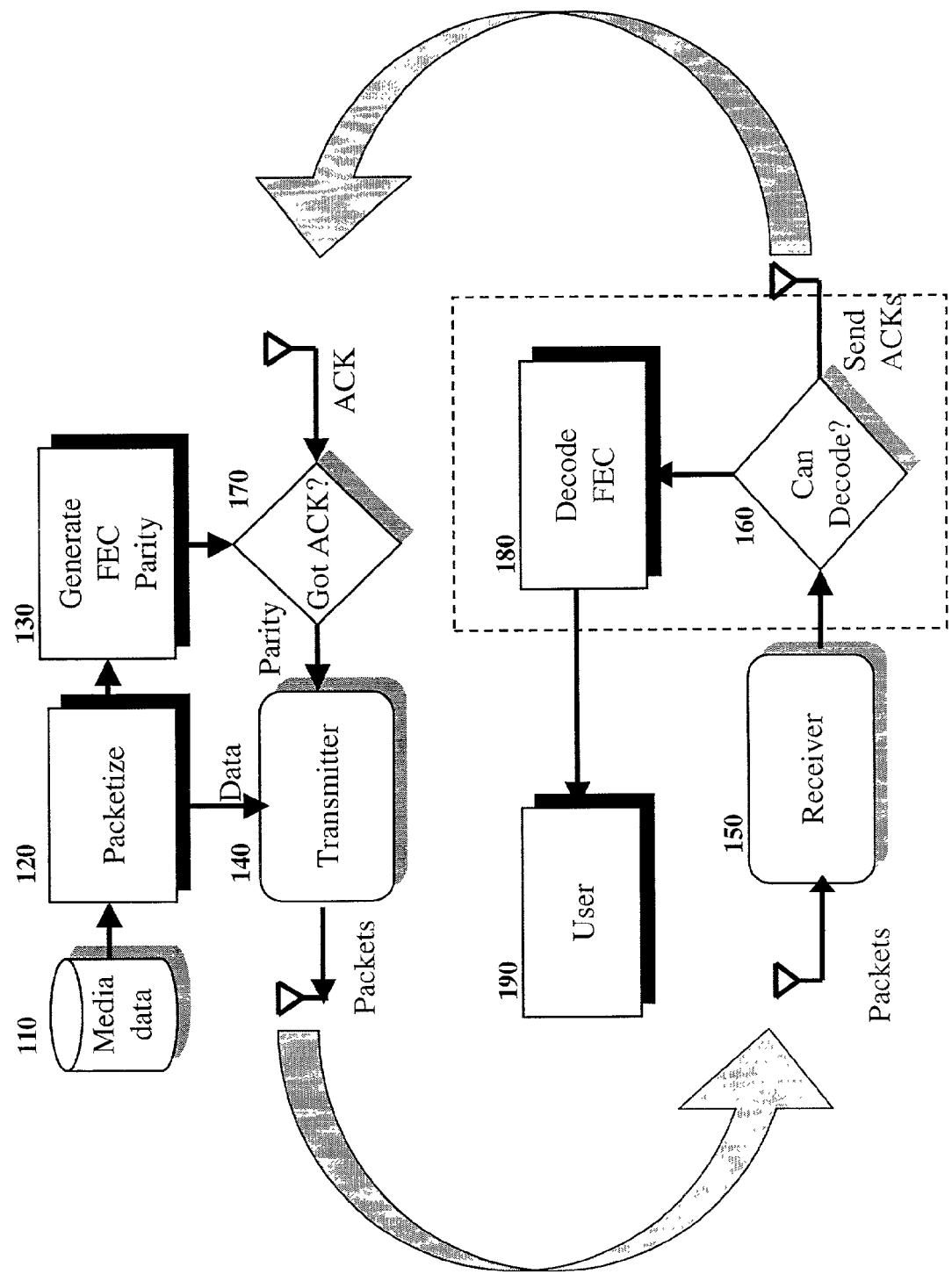
FIG. 1 is a block diagram illustrating the transmission of data packets according to one embodiment.

An exemplary diagram of transmitting packets, according to one embodiment, is presented in FIG. 1. The media data 110 is packetized into a Group of Packets (GOP) 120. In one embodiment, the size of the GOP and the packet size are determined by the communication network being used and by the requirements of the application. For instance, a larger packet size may reduce the overhead due to headers of the transport protocols. On the other hand, the larger packet size may also lead to increased delays and inefficiency in high error-rate environments. The appropriate FEC code is applied to the GOP to generate the desired number of parity packets per GOP 130. The GOP packets together with the parity packets constitute coded GOP (CGOP). In one embodiment, the number of parity packets is chosen depending on the tolerable delay, available bandwidth, and/or channel statistics. Additional considerations may also be considered. The parity packets are generated so that they can replace the lost data packets with little or no overhead. In one embodiment, the redundancy packets may include the original data. The data and redundancy packets may contain any additional information, possibly in the form of headers, required for the overall system control and operation. In one embodiment, a GOP number, a packet number, FEC parameters and/or the packet sizes may be included in the packet.

In one embodiment, the parity packets are generated using the systematic Reed-Solomon (RS) codes, wherein the number of parity packets replaces the same number of (any) data packets so that the data can be decoded intact. Any other suitable FEC channel code may be used to generate the parity packets, such as Tornado codes.

The data is packetized, FEC encoded and sent from the transmitter 140 to the receiver 150. The receiver determines if the transmitting data can be decoded. If the data can be decoded, the receiver sends an acknowledgement to the transmitter, which terminates the transmission of any further redundancy for the current CGOP 170. The transmission is then decoded 180 and sent to the user 190.

Figure 2:
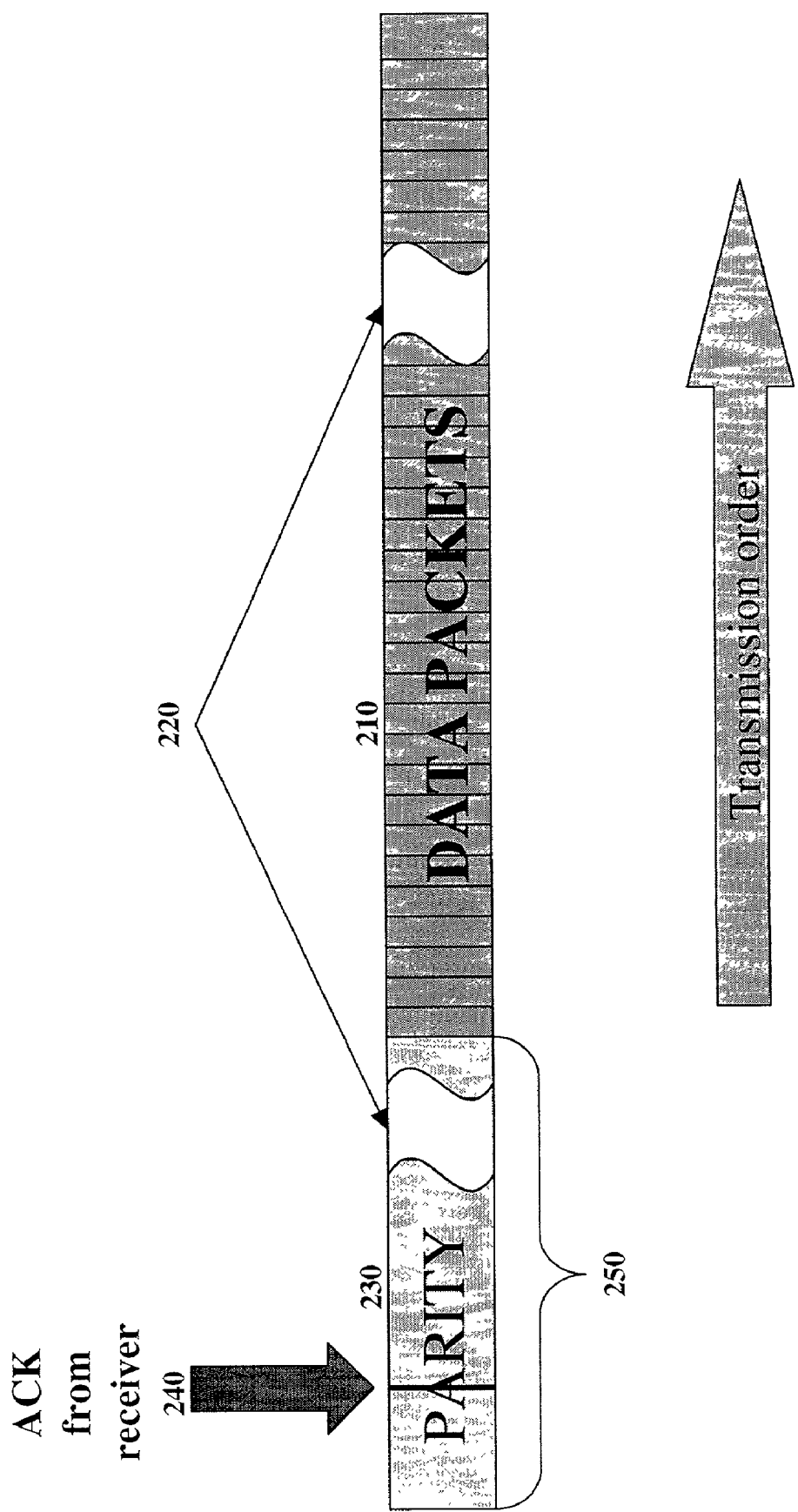
FIG. 2 is a block diagram of one embodiment of a group of packets.

The data and parity packets transmission order according to one embodiment is illustrated in FIG. 2. First the data packets of the current CGOP are sent to the receiver 210. The data packets may be interleaved with the data, parity packets, or both from other CGOP's 220. The parity packets corresponding to the current CGOP are then sent 230 until the acknowledgement from receiver arrives 240 or until the maximum predetermined amount of parity packets is reached or exceeded 250. In one embodiment, the data packets of the current CGOP are sent before the parity packets of the same CGOP. As a result, the data transmission and processing overhead may be reduced when no packets from the current CGOP have been lost. In one embodiment, packets from different CGOP's can be interleaved to give the receiver enough time to process and send the acknowledgement to the transmitter.

In one embodiment, the receiver implements the GOP acknowledgement protocol, which sends an acknowledgement to the transmitter when the receiver can decode the GOP data. The receiver implicitly asks for more parity by not sending an acknowledgement to the receiver. The receiver may send multiple acknowledgements for the same GOP. Multiple acknowledgments can be used when the receiver suspects that the first acknowledgement was (or can be) lost on the return channel.

In an embodiment using RS coding, the acknowledgement can be sent when the number of correctly received packets exactly equals the number of original data packets. The acknowledgement can be sent before the actual decoding takes place to reduce the overall latency. If all the data packets arrive without errors no decoding is needed and the data can be passed directly to the user application.

In an embodiment using Tornado coding, the acknowledgement can be sent when the number of correctly received packets equals the number of original data packets times some predetermined constant greater than unity. The latter constant is determined to provide some desired probability of correct decoding and is determined for each Tornado code by a computer simulation. If all the data packets arrive without errors no decoding is needed and the data can be passed directly to the user application.

Several other acknowledgement mechanisms are compatible with this system. Acknowledgments packets include the CGOP number but may also contain additional information. The additional information may be in the form of control messages to the server, channel statistics and/or other information. In the case of errors on the return channel, such as packet erasures, the transmitter simply sends the maximum number of packets allowed by the algorithm and continues to the next GOP. If after all the parity is sent the data is still not decodable, the transmitter continues to the next GOP. In an embodiment using delay-sensitive multimedia information, the delivery time is upper-bounded so that the proposed solution can be used as is without adding an additional error resolution mechanism. One embodiment may define a higher-level error resolution protocol. The application can also be allowed to deal with the unrecoverable channel error situations.

In one embodiment, the proposed method and apparatus described herein is applicable to video streaming over IEEE 802.11 wireless LAN. At the UDP level, the IEEE 802.11 network acts as a packet erasure channel if the physical layer acknowledgements that are sent even for the UDP traffic are suppressed. In one embodiment, at the physical layer retransmits and acknowledgements from the mobile receiver are suppressed by a multicasting IP addresses in the video streaming application. UDP connections are maintained from the transmitter to the receiver for data traffic and from the receiver to the transmitter for acknowledgements.

In one embodiment, the profile of the communicating channel is taken into account to the FEC parameters (the number of data packets and the parity packets in a CGOP) and other characteristics of the method and apparatus described herein. In one embodiment a CGOP size and the number of parity packets may be chosen so that the integral number of packet erasures over the length of CGOP with a high probability is less than the number of parity packets (for RS coding) or is less than the number of parity packets times some predetermined constant greater than unity (for Tornado coding).

In one embodiment, the method and apparatus described herein could be used for streaming of multimedia data over wireless IP network, from a streaming server to a receiving device. For example, one embodiment could provide the IP network with error resiliency while reducing temporal latency to improve proper playback of data in the streaming setup.

One embodiment could also be used to interface with media playback mechanisms. For example one embodiment may use the Intel® Media Processing Library framework, such that the robust streaming is integrated seamlessly with the playback mechanisms.

Figure 3:
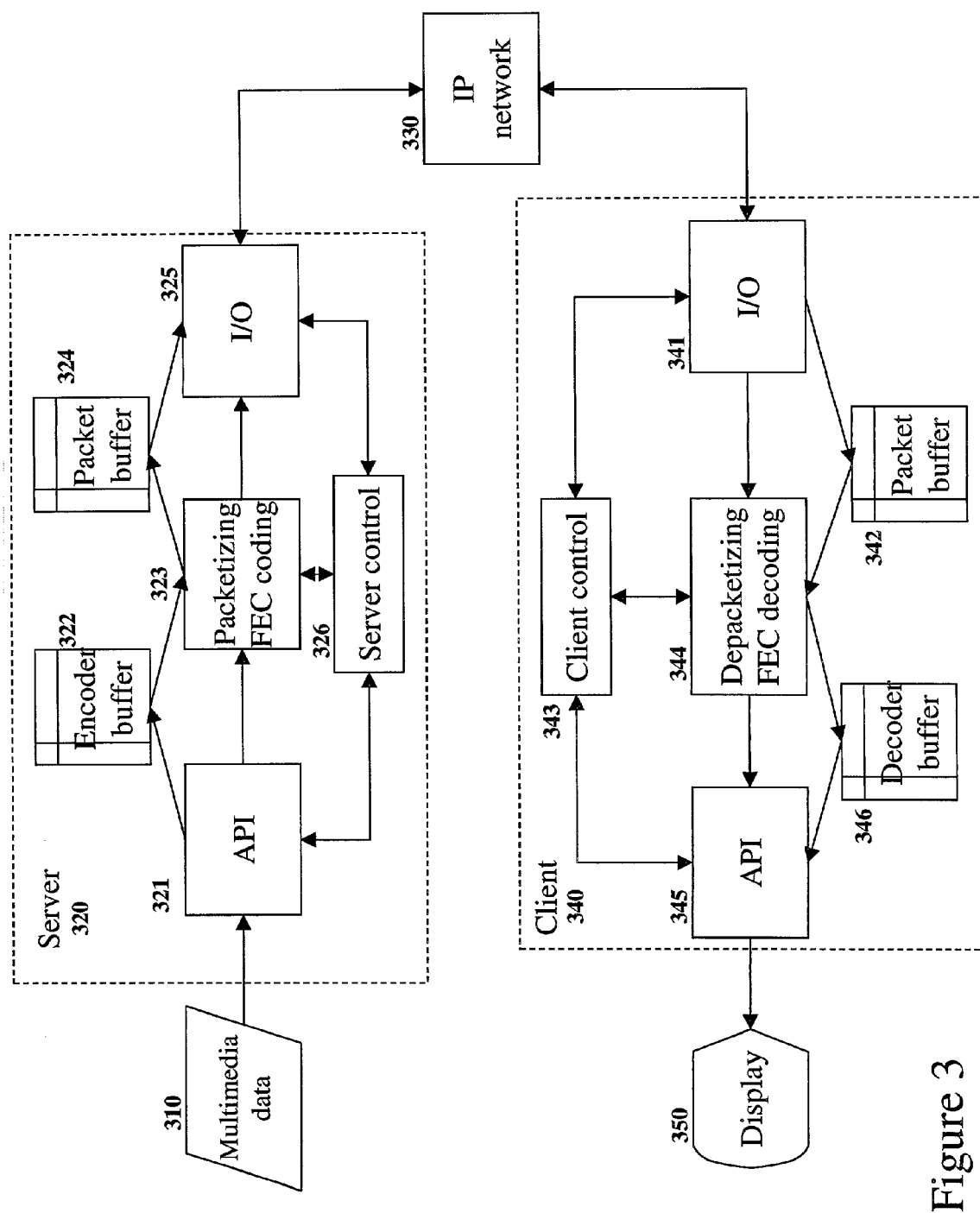
FIG. 3 is a block diagram of a system to transmit data packets according to one embodiment.

FIG. 3 shows the block diagram of one embodiment for streaming multimedia data over an IP network with UDP transport protocol. The multimedia data 310 consists of audio and/or video data, and is stored within a server 320 in the compressed or uncompressed form. The Application Program Interface (API) 321 is used to encode or transcode the media data and store it in the internal encoder buffer 322. In one embodiment the encoder may be compliant with a Moving Picture Experts Group (MPEG) or other video and audio coding standard. In one embodiment, the API provides the packetizing and FEC encoding block 323 with location of the compressed stream headers. In one embodiment the packetizer and FEC create data packets and parity packets. The multimedia data may be packetized in a non-sequential order. Alternatively, different FECs may be used for different multimedia data segments. Conversely, some multimedia data may not be included in data packets. The packetized data and parity are stored in the internal packet buffer 324. The API provides management functionality similar to the encoder buffer. Specifically, the input/output (I/O) block 325 is able to randomly access the data in the packet buffer on a packet basis. The API also provides other additional information about the content of the packets that is required by the I/O. The function of the I/O block is to perform the packet delivery over the IP network and to provide the control link between the server and the client for the ACK transmission. The I/O may send packets several times, drop packets from the transmission buffer or arbitrarily schedule the packet transmission to the Socket API that represents the IP network 330. All three major blocks representing the server are controlled by a central higher-level process 326, which sets the variable parameters of these three components using their API's and also manages the data flow between the blocks and the data buffers.

At the client side 340 the data from the IP network is received by the I/O block 341 and is placed into the packet buffer 342. The I/O block is also responsible for sending the ACK's back to the server side at the direction of the client control process 343. The I/O may also be used to send other control information to the server side. The depacketizing and FEC decoding block 344 processes the data from the packet buffer 342. The depacketizing and FEC decoding block is responsible for correcting data packet erasures and presenting the multimedia encoded data in a form that can be processed by the following decoding block. The compressed multimedia data is passed to the API 345 for the decoding process through the decoding buffer 346. The API decompresses the multimedia data and outputs it to the display 350. The client control 343 manages the data flow between the three blocks described, controls ACK's and other communication to the receiver.

The methods described above can be stored in the memory of a computer system (e.g., set top box, video recorders, etc.) as a set of instructions to be executed. In addition, the instructions to perform the method described above could alternatively be stored on other forms of machine-readable media, including magnetic and optical disks. For example, the method of the present invention could be stored on machine-readable media, such as magnetic disks or optical disks, which are accessible via a disk drive (or computer-readable medium drive). Further, the instructions can be downloaded into a computing device over a data network in a form of compiled and linked version.

Alternatively, the logic to perform the methods as discussed above, could be implemented in additional computer and/or machine readable media, such as discrete hardware components as large-scale integrated circuits (LSI's), application-specific integrated circuits (ASIC's), firmware such as electrically erasable programmable read-only memory (EEPROM's); and electrical, optical, acoustical and other forms of propagated signals (e.g., carrier waves, infrared signals, digital signals, etc.); etc.

Although the present invention has been described with reference to specific exemplary embodiments, it will be evident that various modifications and changes may be made to these embodiments without departing from the broader spirit and scope of the invention. Accordingly, the specification and drawings are to be regarded in an illustrative rather than a restrictive sense.

What is claimed is:

1. A method comprising:
    applying a forward error correction code to data packets to create coded data packets by supplementing parity packets to the data packets;
    transmitting the coded data packets, and transmitting the parity packets after the data packets have been transmitted;
    receiving an acknowledgment in response to one or more of
        a number of correctly received data packets equals a total number of the data packets, and
        the number of correctly received data packets equals the total number of the data packets multiplied by a predetermined constant;
    in response to receiving the acknowledgement, ceasing to send additional parity packets;
    in response to not receiving the acknowledgment, continuing to transmit the parity packets; and
    manipulating the parity packets in response to information included in the acknowledgement.

2. The method of claim 1, wherein the transmitting of the data packets comprises transmitting multi-media data packets over a wireless network.

3. The method of claim 2, wherein the transmitting of the multi-media data packets comprises multi-media streaming over an Internet Protocol (IP) network.

4. The method of claim 3, wherein the multi-media streaming comprises multi-media streaming via the IEEE 802.11 standard over the wireless network.

5. The method of claim 4, wherein the multi-media streaming comprises suppressing physical layer acknowledgements via multicasting IP addresses.

6. The method of claim 1, further comprising generating the parity packets via a Reed-Solomon (RS) code.

7. The method of claim 1, generating the parity packets via a Tornado code.

8. The method of claim 1, wherein the transmitting the data packets comprises interleaving and transmitting a separate group of data packets.

9. The method of claim 1, further comprising receiving multiple acknowledgements for the data packets.

10. A machine-readable medium having stored thereon data representing sets of instructions which, when executed by a machine, cause the machine to:
    apply a forward error correction code to data packets to create coded data packets by supplementing parity packets to the data packets;
    transmit the coded data packets, and transmitting the parity packets after the data packets have been transmitted;
    receive an acknowledgment in response to one or more of
        a number of correctly received data packets equals to a total number of the data packets, and
        the number of correctly received data packets equals the total number of the data packets multiplied by a predetermined constant;
    in response to receiving the acknowledgement, cease to send additional parity packets;
    in response to not receiving the acknowledgement, continue to transmit the parity packets; and
    manipulate the parity packets in response to information included in the acknowledgement.

11. The machine-readable medium of claim 10, wherein the set of instructions when executed, further cause the machine to transmit multi-media data packets over a wireless network.

12. The machine-readable medium of claim 11, wherein the transmitting of the multi-media data packets comprises multi-media streaming over an Internet Protocol (IP) network.

13. The machine-readable medium of claim 12, wherein the multi-media streaming comprises multi-media streaming via the IEEE 802.11 standard over the wireless network.

14. The machine-readable medium of claim 13, wherein the multi-media streaming comprises suppressing physical layer acknowledgements via multicasting IP addresses.

15. The machine-readable medium of claim 10, wherein the set of instructions when executed by the machine, further cause the machine to generate the parity packets via a Reed-Solomon (RS) code.

16. The machine-readable medium of claim 10, wherein the set of instructions when executed by the machine, further cause the machine to generate the parity packets via a Tornado code.

17. The machine-readable medium of claim 10, wherein the transmitting the data packets includes interleaving and transmitting a separate group of data packets.

18. The machine-readable medium of claim 10, wherein the sets of instructions when executed by the machine, further cause the machine to receive multiple acknowledgements for data packets.

19. A system comprising:
an encoder to apply a forward error correction code to data packets to create coded data packets by supplementing parity packets to the data packets;
a transmitter coupled to the encoder, the transmitter to
transmit the coded data packets to a receiver over a network,
transmit the parity packets, and
receive an acknowledgment from a receiver in response to one or more of
a total number of the data packet, and
the number of correctly received data packets equals the total number of the data packets multiplied by a predetermined constant; and
the receiver coupled to the encoder and transmitter, the receiver to send the acknowledgement, wherein in response to receiving the acknowledgement at the transmitter, the transmitter to cease to send additional parity packets; and in response to not receiving the acknowledgment, the transmitter to continue to transmit the parity packets, the transmitter is further to manipulate the parity packets in response to information included in the acknowledgement.

20. The system of claim 19, wherein the transmitter is further to stream the data packets over an Internet Protocol (IP) network, wherein the data packets include multi-media data packets.

21. The system of claim 20, wherein the transmitter is further to stream the multi-media data packets via the IEEE 802.11 standard over a wireless network.

22. The system of claim 20, wherein the transmitter is further to suppress physical layer acknowledgements via multicasting IP addresses.

23. The system of claim 19, further comprises a generator coupled with the transmitter, the generator to generate the parity packets via a Reed-Solomon code (RS).

24. The system of claim 23, wherein the generator is further to generate the parity packets via a Tornado code.

25. The system of claim 19, wherein the transmitter is further to interleave a separate group of data packets.

\* \* \* \* \*